(12) United States Patent
Wang et al.

(10) Patent No.: US 11,867,194 B2
(45) Date of Patent: Jan. 9, 2024

(54) IMPELLER APPARATUS AND AIR BLOWING DEVICE

(71) Applicants: GD MIDEA ENVIRONMENT APPLIANCES MFG CO., LTD., Zhongshan (CN); MIDEA GROUP CO., LTD., Foshan (CN)

(72) Inventors: Qing Wang, Zhongshan (CN); Zhenbin He, Zhongshan (CN); Wenbo Du, Zhongshan (CN); Xin Yang, Zhongshan (CN); Hanfei Chen, Zhongshan (CN); Zhiping Sun, Zhongshan (CN); Mingbi Li, Zhongshan (CN)

(73) Assignees: GD MIDEA ENVIRONMENT APPLIANCES MFG CO., LTD., Zhongshan (CN); MIDEA GROUP CO., LTD., Foshan (CN)

( * ) Notice: Subject to any disclaimer, the term of this patent is extended or adjusted under 35 U.S.C. 154(b) by 107 days.

(21) Appl. No.: 17/624,075

(22) PCT Filed: Sep. 27, 2019

(86) PCT No.: PCT/CN2019/108664
§ 371 (c)(1),
(2) Date: Dec. 30, 2021

(87) PCT Pub. No.: WO2021/017144
PCT Pub. Date: Feb. 4, 2021

(65) Prior Publication Data
US 2022/0356886 A1    Nov. 10, 2022

(30) Foreign Application Priority Data
Aug. 1, 2019   (CN) .......................... 201921236063.1

(51) Int. Cl.
*F04D 29/28* (2006.01)
*F04D 17/02* (2006.01)
*F04D 29/42* (2006.01)

(52) U.S. Cl.
CPC ........... *F04D 29/281* (2013.01); *F04D 17/02* (2013.01); *F04D 29/4226* (2013.01)

(58) Field of Classification Search
CPC .................................................. F04D 29/4226
See application file for complete search history.

(56) References Cited

U.S. PATENT DOCUMENTS 9,493,903 B2 * 11/2016 Yu .......................... F04D 29/666
9,759,441 B2 *  9/2017 Tadokoro ............ F04D 29/4226
(Continued)

FOREIGN PATENT DOCUMENTS

CN  201166456 Y  12/2008
CN  201181069 Y   1/2009
(Continued)

OTHER PUBLICATIONS

Liu, 2019, CN 208966706 U English Translation (Year: 2019).*
(Continued)

*Primary Examiner* — Michael L Sehn
(74) *Attorney, Agent, or Firm* — Anova Law Group, PLLC

(57) ABSTRACT

An impeller apparatus includes a housing, an impeller, and a heat generation member. The housing includes an air duct formed in the housing. The air duct includes a first air duct and a second air duct successively connected to each other. The second air duct has a non-blocking area. The impeller is arranged in the first air duct. The heat generation member is rotatably arranged in the second air duct and has a blocking state and a non-blocking state. In the blocking state, the heat generation member blocks the second air duct, in the non-
(Continued)

blocking state, the heat generation member is accommodated in the non-blocking area and does not block the second air duct.

19 Claims, 7 Drawing Sheets

(56) References Cited

U.S. PATENT DOCUMENTS

| | | | |
|---|---|---|---|
| 2009/0057432 | A1 | 3/2009 | Tazawa et al. |
| 2010/0084115 | A1 | 4/2010 | Sung |

FOREIGN PATENT DOCUMENTS

| | | | |
|---|---|---|---|
| CN | 201241847 | Y | 5/2009 |
| CN | 101614426 | A | 12/2009 |
| CN | 101712267 | A | 5/2010 |
| CN | 204025153 | U | 12/2014 |
| CN | 109737505 | A | 5/2019 |
| CN | 208966706 | U * | 6/2019 |
| DE | 2208377 | A1 | 9/1973 |
| DE | 19911645 | A1 | 9/2000 |
| DE | 102007001877 | A1 | 10/2007 |
| JP | S4851049 | U | 7/1973 |
| JP | S5943697 | U | 3/1984 |
| JP | S60219496 | A | 11/1985 |
| JP | H03207957 | A | 9/1991 |
| JP | 2007210598 | A | 8/2007 |
| WO | 2015192493 | A1 | 12/2015 |
| WO | 2018137425 | A1 | 8/2018 |

OTHER PUBLICATIONS

Shindoh, 2007, DE 102007001877 A1 English Translation (Year: 2007).*
World Intellectual Property Organization (WIPO) International Search Report and Written opinion for PCT/CN2019/108664 dated Apr. 24, 2020 21 Pages (Translation Included).
The European Patent Office (EPO) Extended Search Report for EP Application No. 19939294.5 dated Aug. 9, 2022 7 Pages.
Japan Patent Office (JPO) The Notice of Reasons for Refusal For JP Application No. 2022-502823 dated Jan. 24, 2023 10 Pages (Translation Included).

* cited by examiner

IMPELLER APPARATUS AND AIR BLOWING DEVICE

CROSS-REFERENCE TO RELATED APPLICATIONS

This application is a National Stage Entry under 35 U.S.C. 0371 of International Application No. PCT/CN2019/108664, filed on Sep. 27, 2019, which is based upon and claims priority to Chinese Patent Application No. 201921236063.1, filed on Aug. 1, 2019, the content contents of both of which are incorporated herein by reference in their entirety.

TECHNICAL FIELD

The disclosure relates to the technical field of air conditioning, and in particular to an impeller apparatus and a blowing device.

BACKGROUND

Taking a cold fan as an example, in the related art, in order to realize cold/hot airflow switching, a movable heat generation element is mounted inside the cold fan, and a mobile device drives the heat generation element to translate, thereby switching the cold/hot airflow. The translation of the heat generation element requires sufficient interior space, resulting in a bulky blowing device.

SUMMARY

In view of the above, embodiments of the disclosure are intended to provide an impeller apparatus and a blowing device that have a compact structure.

To achieve the above object, a first aspect of embodiments of the disclosure provides an impeller apparatus including a housing, a heat generation member and an impeller. An air duct is formed in the housing, and the air duct includes a first air duct and a second air duct successively connected to each other. The impeller is arranged in the first air duct, and the second air duct includes a non-blocking area. The heat generation member is rotatably arranged in the second air duct. The heat generation member has a blocking state in which the heat generation member blocks the second air duct and a non-blocking state in which the heat generation member does not block the second air duct. The heat generation member is accommodated in the non-blocking area when the heat generation member is in the non-blocking state.

Further, the non-blocking area is formed by a first side of the second air duct protruding outwardly.

Further, when the heat generation member is in the non-blocking state, a minimum width C between a surface of the heat generation member away from a first side of the second air duct and a second side of the second air duct opposite to the first side is greater than or equal to a width of a tail end of the first air duct.

Further, an axis of rotation of the heat generation member is parallel to an axis of rotation of the impeller.

Further, a ratio of a width at a head end of the first air duct in an airflow direction to a width at a tail end of the first air duct in the airflow direction is between 1.6 and 2.

Further, the housing includes a volute tongue and a volute casing spaced apart from each other. The first air duct is formed between the volute tongue and the volute casing. A spacing E between the volute tongue and an outer edge of the impeller is between 2 mm and 4 mm.

Further, the housing includes a volute tongue and a volute casing spaced apart from each other. The first air duct is formed between the volute tongue and the volute casing. A spacing D between an inner surface of the volute casing and an outer edge of the impeller gradually increases in an airflow direction.

Further, a shape of the inner surface of the volute casing is an involute, and a base circle of the involute conforms to the impeller.

Further, the housing includes a first end plate, a first side plate, a second end plate and a second side plate. The first side plate and the second side plate are spaced apart from each other. The first end plate is arranged between a first end of the first side plate and a first end of the second side plate for connecting the first end of the first side plate and the first end of the second side plate with each other. The second end plate is arranged between a second end of the first side plate and a second end of the second side plate for connecting the second end of the first side plate and the second end of the second side plate with each other. The first end plate, the first side plate, the second end plate and the second side plate together form the air duct. The heat generation member is rotatably mounted at the first end plate and the second end plate, and the impeller is rotatably mounted at the first end plate and the second end plate.

Further, the first side plate includes a volute casing and a sub-side plate which are located at the same side of the air duct. The volute casing corresponds to the first air duct, and the sub-side plate corresponds to the second air duct. The volute casing is separable from the sub-side plate; or the volute casing is integrally formed with the sub-side plate.

Further, when the volute casing is separable from the sub-side plate, one of the volute casing and the sub-side plate is formed with a snap, and the other one of the volute casing and the sub-side plate is formed with a slot. The snap is snapped into the slot.

Further, the first end plate is formed with an open groove, and the open groove extends to an edge of the first end plate and is formed with an opening at the edge of the first end plate. The heat generation member includes a heat generation body and a shaft member at one end of the heat generation body. The shaft member is capable of being interposed in the open groove from the opening. The impeller apparatus includes a driving mechanism, and the driving mechanism is connected to the shaft member and drives the shaft member.

Further, the impeller apparatus further includes a sleeve. A tail end of the open groove away from the opening is formed with an arc-shaped hole. The sleeve is arranged in the arc-shaped hole and adapted to the arc-shaped hole. The sleeve is arranged around the shaft member. The driving mechanism includes a power shaft, and the power shaft extends into the sleeve, is connected to the shaft member and drives the shaft member.

Further, the housing further includes elastic buckles. At least one of the elastic buckles is arranged at an edge of the first side plate; and/or at least one of the elastic buckles is formed at an edge of the second side plate.

A second aspect of embodiments of the disclosure provides a blowing device including an enclosure and an impeller apparatus as described above. The impeller apparatus is arranged in the enclosure. An air inlet and an air outlet are formed on the enclosure, and the air duct is in communication with the air inlet and the air outlet.

The impeller apparatus of the embodiment of the disclosure is provided with a first air duct and a second air duct successively connected to each other. The heat generation member is rotatably arranged in the second air duct, and the second air duct includes a non-blocking area. The heat generation member is rotated into the non-blocking area when the heat generation member is in the non-blocking state. Therefore, the heat generation member only needs to occupy a small space, so that the impeller apparatus has a compact structure.

DETAILED DESCRIPTION

It should be noted that the embodiments and the technical features of the embodiments of the disclosure may be combined with each other without conflict, and the description of the detailed description should be understood as an explanation of the disclosure and should not be construed as unduly limiting the disclosure.

Figure 3:
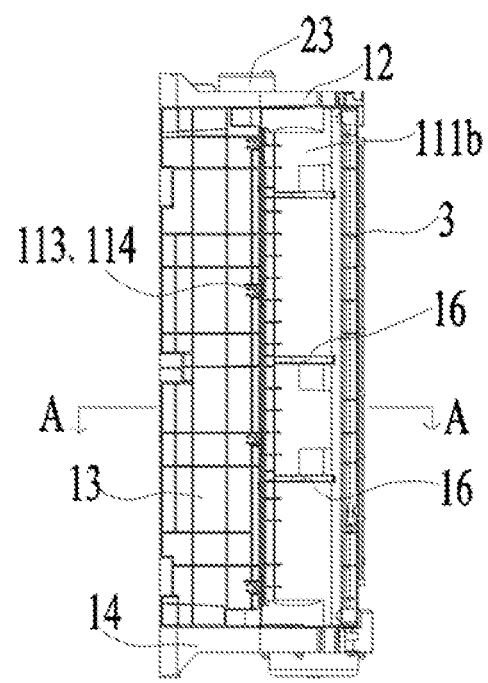
FIG. 3 is a schematic diagram of the impeller apparatus shown in FIG. 1 from yet another view.

In the description of the embodiments of the disclosure, orientational or positional relationships such as "on," "under" are based on an orientational or positional relationship shown in FIG. 3. It should be understood that these orientation terms are intended solely for ease of describing the disclosure and simplifying the description, and are not intended to indicate or imply that the devices or elements must have a particular orientation, be constructed and operated in a particular orientation. Therefore, these orientation terms are not to be understood as limiting the disclosure.

For ease of description, in an embodiment of the disclosure, an example in which the impeller apparatus is applied to a fan heater is described.

Figure 4:
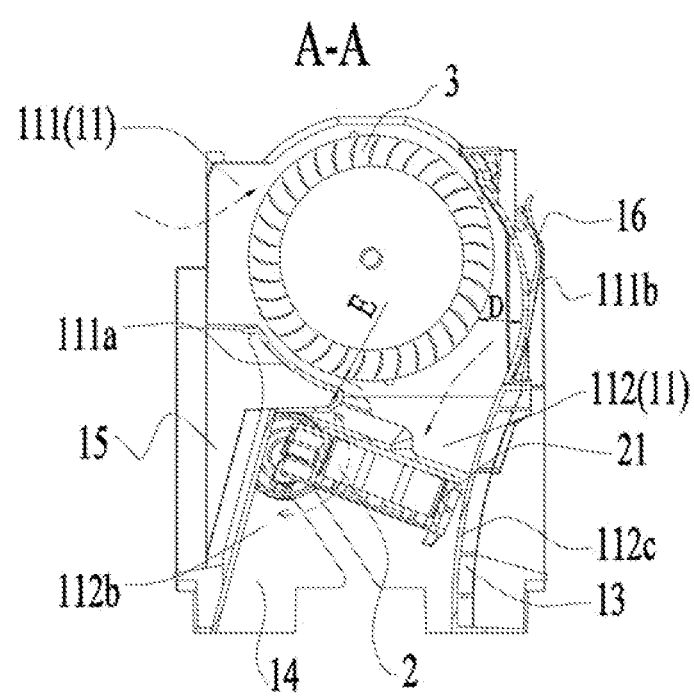
FIG. 4 is a schematic cross-sectional view along the direction A-A in FIG. 3, rotated by 90 degrees counterclockwise relative to orientation of FIG. 3, in which a heat generation member is in a blocking state.

Referring to FIG. 1 to FIG. 6, an embodiment of the disclosure provides an impeller apparatus including a housing 1, a heat generation member 2 and an impeller 3. An air duct 11 is formed in the housing 1, and the air duct 11 includes a first air duct 111 and a second air duct 112 successively connected to each other. The impeller 3 is arranged in the first air duct 111. The heat generation member 2 is rotatably arranged in the second air duct 112, that is, a direction of airflow in the air duct 11 is a direction from the first air duct 111 to the second air duct 112 (the arrow direction in FIG. 4 and FIG. 5). The second air duct 112 includes a non-blocking area 112b. The heat generation member 2 has a blocking state in which the heat generation member 2 blocks the second air duct 112 and a non-blocking state in which the heat generation member does not block the second air duct 112. Referring to FIG. 4, it will be appreciated that the non-blocking area 112b can be formed by a first side of the second air duct 112 protruding outwardly, and can be integrally molded with the second air duct 112, which is simple in process and aesthetic.

Figure 5:
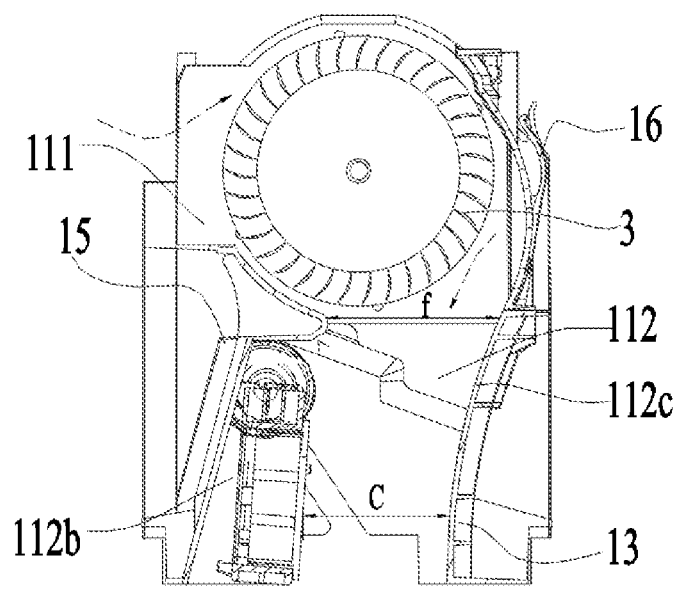
FIG. 5 is a schematic diagram in the same cross-sectional position as FIG. 4, in which the heat generation member is in a non-blocking state.
Figure 6:
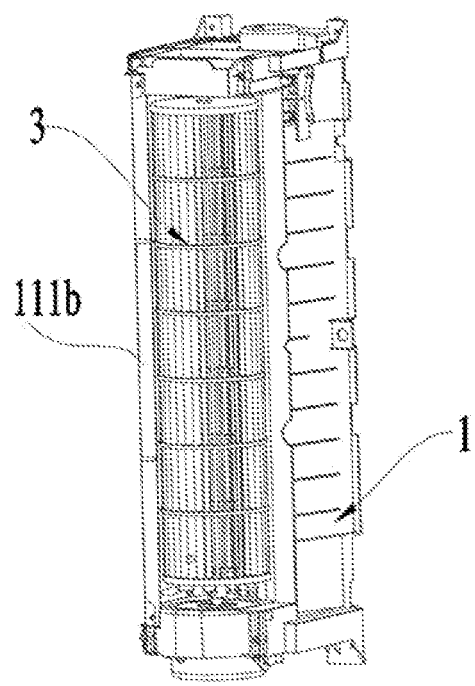
FIG. 6 is a schematic diagram of the impeller apparatus shown in FIG. 1 from still another view.

Specifically, referring to FIG. 4, when the heat generation member 2 is rotated to an angle in which the second air duct 112 is blocked by the heat generation member 2, the heat generation member 2 is in the blocking state. In the blocking state, the airflow is driven by the impeller 3 to enter into the air duct 11 from the first air duct 111, is heated by the heat generation member 2 to increase the temperature of the airflow, and is discharged from the second air duct 112, thereby achieving the function of blowing hot wind of the fan heater. Referring to FIG. 5, when the heat generation member 2 is rotated to an angle in which the second air duct 112 is not blocked by the heat generation member 2, the heat generation member 2 is in the non-blocking state. In the non-blocking state, the airflow is driven by the impeller 3 to enter into the air duct 11 from the first air duct 111, and to be discharged from the second air duct 112, thereby achieving the function of blowing room-temperature wind of the fan heater.

According to the impeller apparatus of the embodiment of the disclosure, the heat generation member 2 is rotatably arranged in the second air duct 112. Therefore, the heat generation member 2 only needs to occupy a small space, so that the impeller apparatus has a compact structure. Further, when the heat generation member 2 is in the non-blocking state, the heat generation member 2 is accommodated in the non-blocking area, so that the airflow can be directly discharged without flowing through the heat generation member 2. This effectively reduces the wind resistance, and increases the wind quantity and wind speed of the fan heater, so that the performance of the blowing device is good. In an embodiment of the disclosure, referring to FIG. 5, when the heat generation member 2 is in the non-blocking state, a minimum width C between a surface of the heat generation member 2 away from a first side of the second air duct 112 and a second side of the second air duct 112 opposite to the first side is greater than or equal to a width f of a tail end of the first air duct 111. Therefore, the effective flow area of the airflow from the first air duct 111 to the second air duct 112 is in an equal or enlarged state, thereby preventing the wind quantity and wind speed in the second air duct 112 from changing due to the reduction of the effective flow area.

In an embodiment of the disclosure, an axis of rotation of the heat generation member 2 is parallel to an axis of rotation of the impeller 3, so as to prevent the heating element unit 2 from tilting in the air duct 11. In other words, the heating element unit 2 is either completely in the blocking state or completely in the non-blocking state in an axial direction of the heating element unit 2. However, it is impossible that a part of the heating element unit 2 is in the blocking state and the remaining part of the heating element unit 2 is in the non-blocking state.

In an embodiment of the disclosure, referring to FIG. 4 and FIG. 5, a ratio of a width d1 at a head end of the first air duct 111 in an airflow direction to a width d2 at a tail end of the first air duct in the airflow direction is between 1.6 and 2, thereby forming a structure with a large inlet and a small outlet. The airflow enters from the head end of the wider first air duct 111. When the wind quantity is satisfied, the airflow has a slow flow rate and low noise, and the airflow is driven by the impeller 3 to be discharged from the tail end of the first air duct 111, so that the wind speed of the fan heater is satisfied.

In an embodiment of the disclosure, referring to FIG. 4 and FIG. 5, the housing 1 includes a volute tongue 111a and a volute casing 111b spaced apart from each other. The first air duct 111 is formed between the volute tongue 111a and the volute casing 111b. It is not suitable that a spacing E between the volute tongue 111a and an outer edge of the impeller 3 is too large or too small. If the spacing E is too large, the airflow enters from the first air duct 111, the impeller 3 rotates in the clockwise direction in FIG. 4, and a large part of the airflow in the first air duct 111 is carried out of the first air duct 111 by the impeller 3 from the spacing E, which affects the airflow entering the second air duct 112, so that the wind quantity and wind speed are affected. If the spacing E is too small, the requirements for the assembly error of each part of the structure and the sloshing amount of the impeller 3 during the rotation of the impeller 3 are high, otherwise it is easy to cause interference between the volute tongue 111a and the impeller 3 which will generate abnormal sound. In an embodiment of the disclosure, the spacing E is between 2 mm and 4 mm, so that more airflow flows toward the second air duct 112 while ensuring stable performance, thereby increasing the wind quantity and wind speed.

In an embodiment of the disclosure, referring to FIG. 4 and FIG. 5, a spacing D between an inner surface of the volute casing 111b and the outer edge of the impeller 3 gradually increases in the airflow direction, so that the outlet side in the airflow direction is always expanded outward to form a diffusing air duct. Therefore, the static pressure is increased, the wind speed flowing through the impeller is improved due to the narrow tube effect, the output efficiency is increased, and finally a large wind quantity and low noise are ensured. With reference to FIG. 4 and FIG. 5, in order to satisfy the requirement that the spacing E between the inner surface of the volute casing 111b and the outer edge of the impeller 3 gradually increases, a shape of the inner surface of the volute casing 111b may be an involute, and a base circle of the involute conforms to the impeller 3. The pattern of the involute is more favorable to the hydrodynamic design performance, so that the airflow can flow more smoothly along the inner surface of the volute casing 111b.

Figure 1:
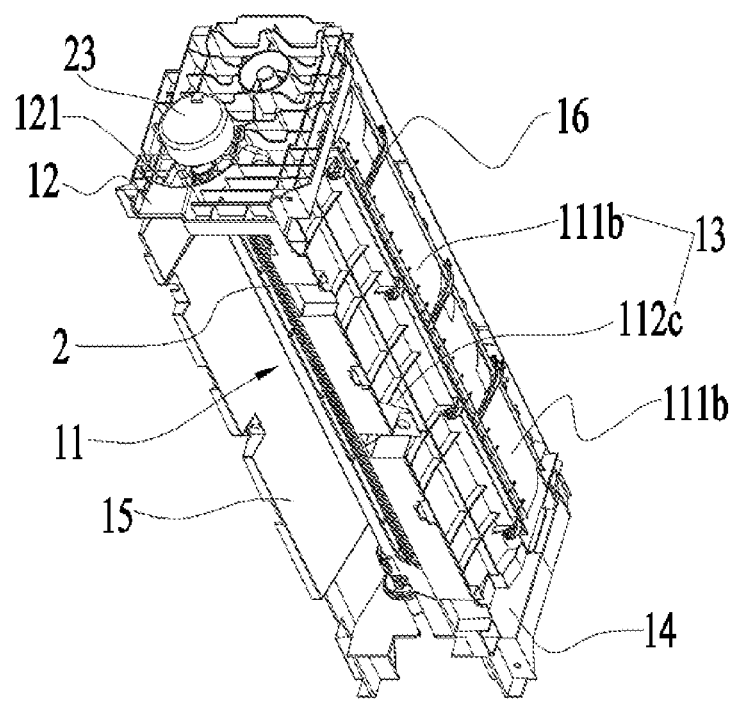
FIG. 1 is a schematic diagram of an impeller apparatus according to an embodiment of the disclosure.

In an embodiment of the disclosure, referring to FIG. 1 to FIG. 5, the housing 1 includes a first end plate 12, a first side plate 13, a second end plate 14 and a second side plate 15. The first side plate 13 and the second side plate 15 are spaced apart from each other. The first end plate 12 is arranged between a first end of the first side plate 13 and a first end of the second side plate 15 for connecting the first end of the first side plate 13 and the first end of the second side plate 15 with each other. The second end plate 14 is arranged between a second end of the first side plate 13 and a second end of the second side plate 15 for connecting the second end of the first side plate 13 and the second end of the second side plate 15 with each other. The first end plate 12, the first side plate 13, the second end plate 14 and the second side plate 15 together form the air duct 11. The heat generation member 2 is rotatably mounted at the first end plate 12 and the second end plate 14, and the impeller 3 is rotatably mounted at the first end plate 12 and the second end plate 14, so that the airflow in the first air duct 111 is driven to enter into the second air duct 112, thereby realizing the function of blowing hot wind and blowing room-temperature wind of the impeller apparatus in the fan heater. With reference to FIG. 1, the first side plate 13 includes a volute casing 111b and a sub-side plate 112c which are located at the same side of the air duct 11. The volute casing 111b corresponds to the first air duct 111, that is, the volute casing 111b and the volute tongue 111a form first air duct 111. The sub-side plate 112c corresponds to the second air duct 112, that is, the sub-side plate 112c and the second side plate 15 form the second air duct 112.

Specifically, the volute casing 111b may be separable from the sub-side plate 112c; or the volute casing 111b may be integrally formed with the sub-side plate 112c. When the volute casing 111b is separable from the sub-side plate 112c, the volute casing 111b is detachably connected to the sub-side plate 112c. One of the volute casing 111b and the sub-side plate 112c is formed with a snap 113, and the other one of the volute casing 111b and the sub-side plate 112c is formed with a slot 114. The snap 113 is snapped into the slot 114, that is, the volute casing 111b is engaged with the sub-side plate 112c, so that the structure is reliable and the assembly is simple. It will be appreciated that other means such as screw connection or interference assembly can be used to connect the volute casing 111b and the sub-side plate 112c with each other, which will not be described herein. When the volute casing 111b is integrally formed with the sub-side plate 112c, the volute casing 111b and the sub-side plate 112c can be integrally molded by a mold, which omits the assembly process.

Figure 2:
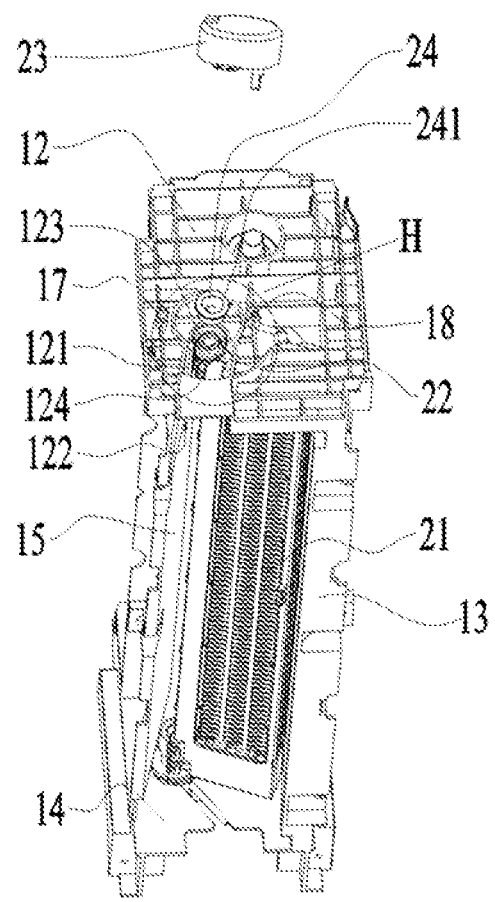
FIG. 2 is a schematic diagram of the impeller apparatus shown in FIG. 1 from another view, in which a part of the impeller apparatus is shown as an exploded schematic diagram.

In an embodiment of the disclosure, referring to FIG. 2, the first end plate 12 is formed with an open groove 121, and the open groove 121 extends to an edge of the first end plate 12 and is formed with an opening 122 at the edge of the first end plate 12. That is, the open groove 121 penetrates through an edge of the housing 1 located at the first end plate 12. The heat generation member 2 includes a heat generation body 21 and a shaft member 22 at one end of the heat generation body 21. The shaft member 22 is capable of being interposed in the open groove 121 from the opening 122, so that the heat generation body 21 can be pushed into the second air duct 112.

The impeller apparatus includes a driving mechanism 23, and the driving mechanism 23 is connected to the shaft member 22 and drives the shaft member 22, to drive the heat generation body 21 to rotate in the second air duct 112. Specifically, the driving mechanism 23 drives the heat generation body 21 to rotate about an axis of rotation of the shaft member 22.

Specifically, the driving mechanism 23 can be a motor, which has low cost and stable performance.

Figure 7:
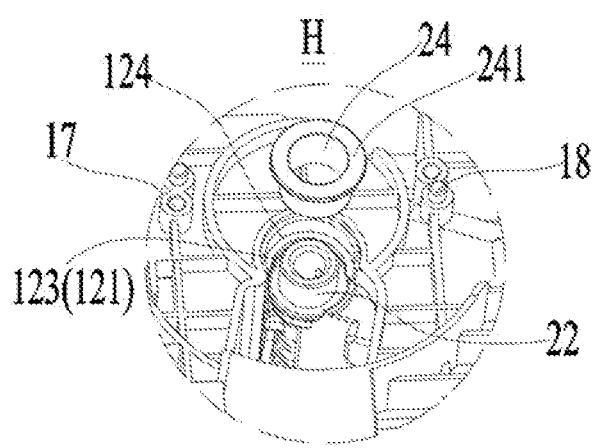
FIG. 7 is enlarged partial diagram of a portion H of FIG. 2.

In an embodiment of the disclosure, referring to FIG. 2 and FIG. 7, the impeller apparatus further includes a sleeve 24, and the sleeve 24 is arranged around the shaft member 22 so as to limit the shaft member 22 in a circumferential direction of the shaft member 22. Therefore, the shaft member 22 is prevented from sloshing in the lateral direction which generates abnormal noise, when the shaft member 22 is driven by the driving mechanism 23. A tail end of the open groove 121 away from the opening 122 is formed with an arc-shaped hole 123. The sleeve 24 is arranged in the arc-shaped hole 123 and adapted to the arc-shaped hole 123. That is, the outer diameter of the sleeve 24 is approximately equal to the inner diameter of the arc-shaped hole 123, so as to perform better circumferential positioning of the sleeve 24. During assembly, the driving mechanism 23 is fixedly connected to the first end plate 12, so that the driving mechanism 23 abuts against a side of the sleeve 24 away from the heat generation body 21, that is, the driving mechanism 23 abuts against a top side of the sleeve 24. As such, one side of the sleeve 24 is axially limited by the driving mechanism 23, and the other side of sleeve 24 is axially limited by the arc-shaped hole 123. The sleeve 24 can be positioned and mounted without fastening connections such as screws or the like, so that the heat generation member 2 is fixed to the air duct 11 without screws. On the one hand, the number of parts is reduced, and the quality problems caused by the number of parts can be reduced, on the other hand, the assembly process is simplified and the cost is reduced. The driving mechanism 23 includes a power shaft (not shown). The power shaft extends into the sleeve 24, is connected to the shaft member 22 and drives the shaft member 22.

Specifically, the driving mechanism 23 may be fixed to the first end plate 12 by a bolt connection. Referring to FIG. 7, this design requires the addition of the positioning screw hole 17 to the housing 1, and the guide post 18 may also be provided to facilitate the bolt connection after the driving mechanism 23 is positioned, so that assembly is convenient. Of course, the driving mechanism 23 may be fixed to the first end plate 12 by other fixing means such as a snap connection or the like.

In an embodiment of the disclosure, with reference to FIG. 7, in order to facilitate the supporting and positioning of the sleeve 24, the inner wall of the arc-shaped hole 123 is formed with a step surface 124, the sleeve 24 forms a shoulder 241, and the shoulder 241 abuts against the step surface 124. The sleeve 24 is supported by the step surface 124, and a bottom end of the sleeve 24 abuts against the housing 1, so that a relative rotation between the sleeve 24 and the heat generation member 2 is prevented, thereby reducing the rotation resistance of the heat generation member 2.

In an embodiment of the disclosure, referring to FIG. 3 and FIG. 5, the housing 1 further includes elastic buckles 16.

At least one of the elastic buckles 16 is arranged at an edge of the first side plate 13; and/or at least one of the elastic buckles 16 is formed at an edge of the second side plate 15, so as to facilitate combing the wiring harnesses of the internal components of the blowing device.

A second aspect of embodiments of the disclosure provides a blowing device including an enclosure (not shown) and an impeller apparatus of any of the above. The impeller apparatus is arranged in the enclosure. An air inlet and an air outlet are formed on the enclosure, and the air duct 11 is in communication with the air inlet and the air outlet. Specifically, the first air duct 111 is in communication with the air inlet, and the second air duct 112 is in communication with the air outlet.

It will be appreciated that the blowing device may be a cold fan, a fan heater, an air conditioner, or an air purifier, which is not limited herein.

The various embodiments/implementations provided herein may be combined with each other without conflict.

What described above are merely preferable embodiments of the disclosure, and are not intended to limit the disclosure. Various changes and variations can be made in the disclosure for those skilled in the art. All modifications, replacements and improvements made within the spirit and principles of the disclosure should be included within the scope of protection of the disclosure.

The invention claimed is:

1. An impeller apparatus comprising:
    a housing including:
        an air duct formed in the housing, the air duct including a first air duct and a second air duct successively connected to each other, and the second air duct having a non-blocking area;
        a first side plate;
        a second side plate; and
        a first end plate arranged between and configured to connect a first end of the first side plate and a first end of the second side plate, the first end plate being formed with an open groove, the open groove extending to an edge of the first end plate and being formed with an opening at the edge of the first end plate;
    an impeller arranged in the first air duct;
    a heat generation member rotatably arranged in the second air duct, the heat generation member including a heat generation body and a shaft member at one end of the heat generation body, the shaft member being configured to be interposed into the open groove from the opening, and the heat generation member having:
        a blocking state in which the heat generation member blocks the second air duct; and
        a non-blocking state in which the heat generation member is accommodated in the non-blocking area and does not block the second air duct; and
    a driving mechanism connected to the shaft member and configured to drive the shaft member.

2. The impeller apparatus of claim 1, wherein the non-blocking area is formed by a side of the second air duct protruding outwardly.

3. The impeller apparatus of claim 1, wherein when the heat generation member is in the non-blocking state, a minimum width between a surface of the heat generation member away from a first side of the second air duct and a second side of the second air duct opposite to the first side is greater than or equal to a width of a tail end of the first air duct.

4. The impeller apparatus of claim 1, wherein an axis of rotation of the heat generation member is parallel to an axis of rotation of the impeller.

5. The impeller apparatus of claim 1, wherein a ratio of a width at a head end of the first air duct in an airflow direction to a width at a tail end of the first air duct in the airflow direction is between 1.6 and 2.

6. The impeller apparatus of claim 1, wherein the housing includes a volute tongue and a volute casing spaced apart from each other, the first air duct is formed between the volute tongue and the volute casing, and a spacing between the volute tongue and an outer edge of the impeller is between 2 mm and 4 mm.

7. The impeller apparatus of claim 1, wherein the housing includes a volute tongue and a volute casing spaced apart from each other, the first air duct is formed between the volute tongue and the volute casing, and a spacing between an inner surface of the volute casing and an outer edge of the impeller gradually increases in an airflow direction.

8. The impeller apparatus of claim 7, wherein a shape of the inner surface of the volute casing is an involute, and a base circle of the involute conforms to the impeller.

9. The impeller apparatus of claim 1, wherein:
    the housing further includes:
        a second end plate arranged between and configured to connect a second end of the first side plate and a second end of the second side plate;
    the first end plate, the first side plate, the second end plate, and the second side plate together form the air duct;
    the heat generation member is rotatably mounted at the first end plate and the second end plate; and
    the impeller is rotatably mounted at the first end plate and the second end plate.

10. The impeller apparatus of claim 9, wherein:
the first side plate includes a volute casing and a sub-side plate which are located at a same side of the air duct, the volute casing corresponding to the first air duct, and the sub-side plate corresponding to the second air duct; and
the volute casing is separable from the sub-side plate or the volute casing is integrally formed with the sub-side plate.

11. The impeller apparatus of claim 10, wherein:
the volute casing is separable from the sub-side plate;
one of the volute casing and the sub-side plate is formed with a slot; and
another one of the volute casing and the sub-side plate is formed with a snap configured to be snapped in the slot.

12. The impeller apparatus of claim 9, wherein:
a first elastic buckle is arranged at an edge of the first side plate; and/or
a second elastic buckle is formed at an edge of the second side plate.

13. The impeller apparatus of claim 1, further comprising:
a sleeve arranged in and adapted to an arc-shaped hole formed at a tail end of the open groove away from the opening, the sleeve being arranged around the shaft member;
wherein the driving mechanism includes a power shaft extending into the sleeve and connected to the shaft member, and being configured to drive the shaft member.

14. A blowing device comprising:
an enclosure;
an air inlet and an air outlet formed at the enclosure; and
an impeller apparatus arranged in the enclosure and including:
a housing including:
an air duct formed in the housing, the air duct being in communication with the air inlet and the air outlet, and including a first air duct and a second air duct successively connected to each other, and the second air duct having a non-blocking area;
a first side plate;
a second side plate; and
a first end plate arranged between and configured to connect a first end of the first side plate and a first end of the second side plate, the first end plate being formed with an open groove, the open groove extending to an edge of the first end plate and being formed with an opening at the edge of the first end plate;
an impeller arranged in the first air duct;
a heat generation member rotatably arranged in the second air duct, the heat generation member including a heat generation body and a shaft member at one end of the heat generation body, the shaft member being configured to be interposed into the open groove from the opening, and the heat generation member having:
a blocking state in which the heat generation member blocks the second air duct; and
a non-blocking state in which the heat generation member is accommodated in the non-blocking area and does not block the second air duct; and
a driving mechanism connected to the shaft member and configured to drive the shaft member.

15. The blowing device of claim 14, wherein the non-blocking area is formed by a side of the second air duct protruding outwardly.

16. The blowing device of claim 14, wherein when the heat generation member is in the non-blocking state, a minimum width between a surface of the heat generation member away from a first side of the second air duct and a second side of the second air duct opposite to the first side is greater than or equal to a width of a tail end of the first air duct.

17. The blowing device of claim 14, wherein an axis of rotation of the heat generation member is parallel to an axis of rotation of the impeller.

18. The blowing device of claim 14, wherein a ratio of a width at a head end of the first air duct in an airflow direction to a width at a tail end of the first air duct in the airflow direction is between 1.6 and 2.

19. The blowing device of claim 14, wherein the housing includes a volute tongue and a volute casing spaced apart from each other, the first air duct is formed between the volute tongue and the volute casing, and a spacing between the volute tongue and an outer edge of the impeller is between 2 mm and 4 mm.

* * * * *